May 20, 1969　　　F. C. STURROCK　　　3,445,155
MECHANISM FOR RELATIVE ADJUSTMENT OF AXIALLY SPACED LENS ELEMENT
Filed Aug. 13, 1965　　　　　　　　　　　　　　Sheet 1 of 2

Inventor:
Francis C. Sturrock.
By Barry L. Clark
John E. Peek Jr. Attys

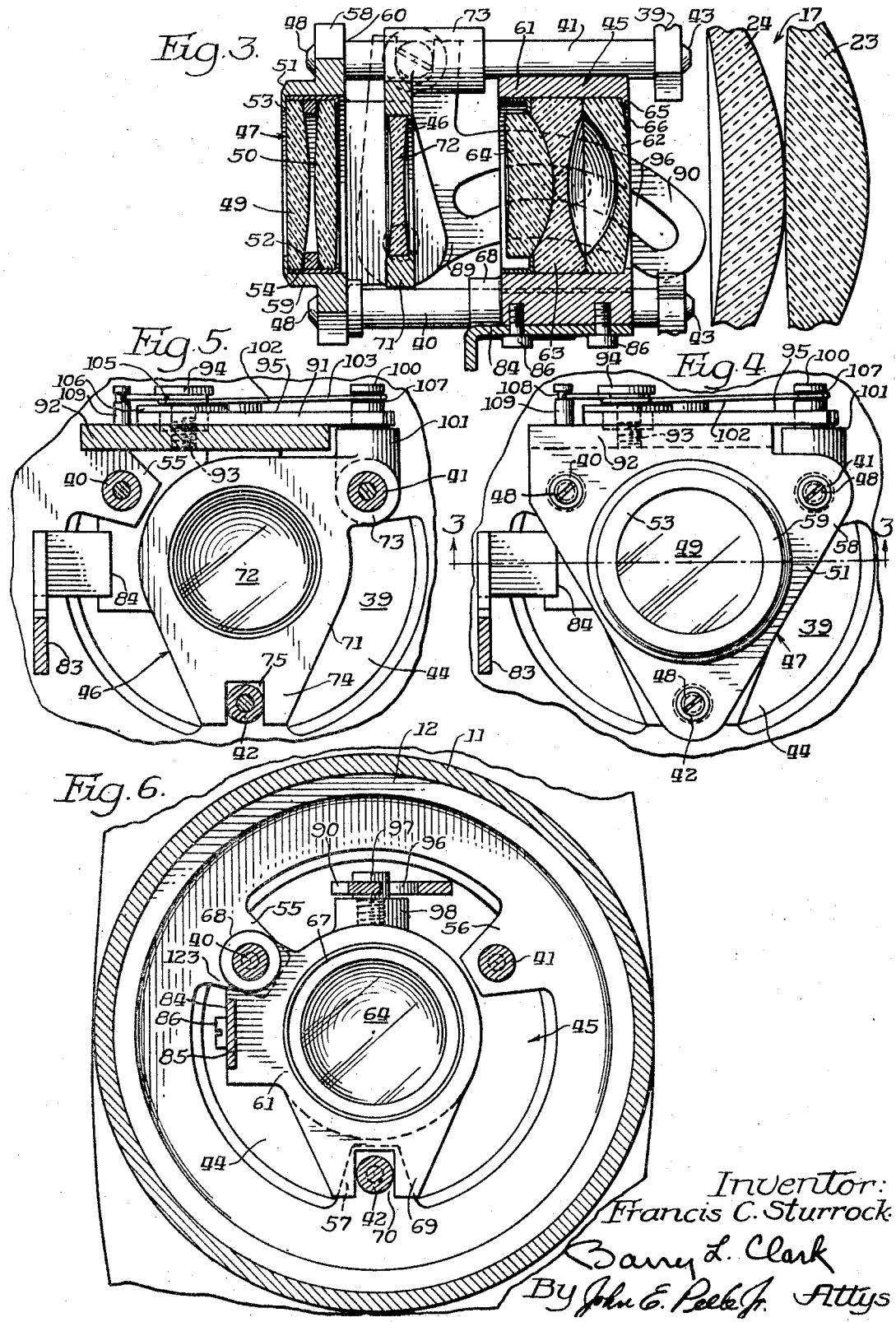

United States Patent Office 3,445,155
Patented May 20, 1969

3,445,155
MECHANISM FOR RELATIVE ADJUSTMENT OF AXIALLY SPACED LENS ELEMENT
Francis C. Sturrock, Skokie, Ill., assignor to Bell & Howell Company, Chicago, Ill., a corporation of Illinois
Filed Aug. 13, 1965, Ser. No. 479,530
Int. Cl. G02b 7/10; B29d 15/00
U.S. Cl. 350—255          5 Claims

ABSTRACT OF THE DISCLOSURE

A follower fixed to a first lens element rides in an arcuate cam slot in one leg of a crank rockable in a flat plane. The other leg of the crank is engaged with a member fixed to a second lens element to drive the latter in opposite axial directions as the first element moves through its range in one axial direction.

---

The present invention relates to a mechanism for axial adjustment of components of an optical system. Particularly the invention relates to a mechanism for relative adjustment of axially spaced lens elements such as those employed in cameras and the like employing zoom lenses.

Progressive magnification or minification of photographic objects may be accomplished with prior art cameras having multiple lens systems by moving their lens elements relative to one another. While such relative movement of the lens elements of each system from a relationship in which an object is in critical focus will necessarily disturb the focal adjustment of such system, critical focus may be maintained upon the object by coincidentally and axially adjusting several elements of the system.

Axial displacement of lens elements or other components of optical systems for focusing purposes can be effected by a variety of mechanisms. Where the displacement must bear a predetermined relationship with the concurrent motion of another element, such mechanisms heretofore have been rather unwieldly, space-consuming, and of complex construction. This is particularly true of vari-focal systems in which two or more components are simultaneously displaceable for changes in the focal length of the system without shifting of its focal or image plane. Restated, in a camera of the class embodying a zoom lens, for example, in which there is a requirement for simultaneous and co-ordinated adjustments of two lens members to the end that all magnifications an image will be in focus on a fixed focal plane, a plurailty of prior art mechanisms are provided for the simultaneous adjustment of such lens members. Numerous of such mechanisms include a pair of cam members by means of which axial displacement of two lens components is governed in the manner such that while the adjusting length of axial displacement of each of the components varies from the adjusting length of movement of the other thereof, the effect of the displacements maintains an image in focus at all stations of lens adjustments.

While the prior cam-included mechanisms are calculated to be highly efficient, the character of the orientation of each cam member with respect to the other is such that great care must be exercized in assembly in order that such cam members are accurately oriented. To the end that cameras of the class with which the instant invention concerns itself can be reduced in cost. it is required that a lens adjusting mechanism be provided which is of simpler construction and also which facilitates assembly.

In accordance with the instant invention and as an object thereof there is provided an improved and simplified mechanism for the control of axial displacement of components of an optical system relative to each other.

A more particular object of the invention is the provision of means in such mechanism for joint control of a plurality of elements related to a vari-focal objective.

Still a further object of the invention is the provision in the means for joint control of an improved cam mechanism rocked by the axial movement of a zoom lens to move a compensating lens in a predetermined path to rectify light delivered to a prime lens for focusing an image on a fixed image plane.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 3 is a longitudinal sectional view taken on a plane parallel to the plane of FIG. 1, such plane being indicated by line 3—3 of FIG. 4 and looking in the direction of the arrows.

FIG. 4 is a cross sectional view of said embodiment taken substantially along line 4—4 of FIG. 2 and looking in the direction of the arrows.

FIG. 5 is a cross sectional view of said embodiment taken substantially along line 5—5 of FIG. 2 and looking in the direction of the arrows.

FIG. 6 is a cross sectional view taken substantially on the line 6—6 of FIG. 2 and looking in the direction of the arrows.

Figure 1:
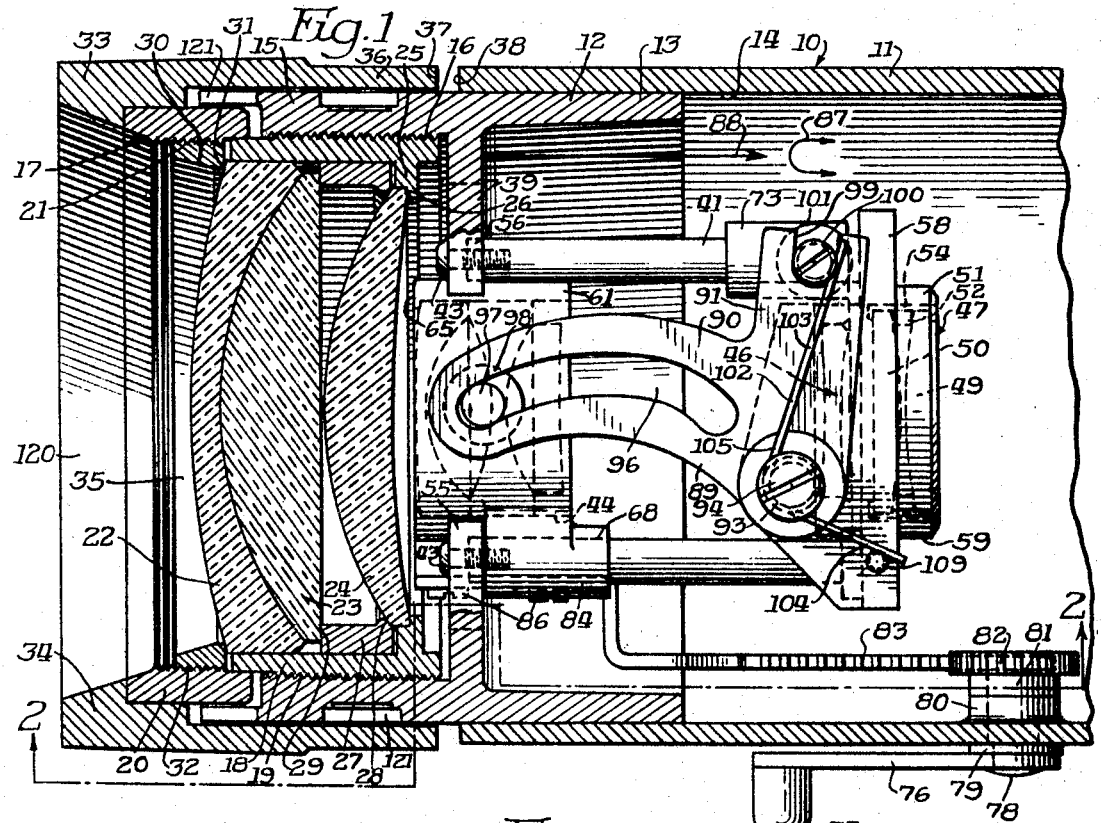
FIG. 1 is a longitudinal sectional view of one portion of a camera characterized by one embodiment of the instant invention.

Referring now more particularly to the drawings, the invention is adapted for use with a zoom lens type camera and the like which may have a housing 10, a portion of which has an outwardly projected tubular section 11 shown of circular cross section and concentric with the optical axis of said camera. A sleeve 12 has one end portion 13 rigidly secured within a bore 14 of the tubular section 11 by any means suitable in a manner such that the opposite end portion 15 of said sleeve 12 is projected axially outwardly from the tubular section 11, as clearly seen in FIGS. 1 and 2. The end portion 15 is internally threaded as shown at 16 in FIG. 1 and thereby provides the means for mounting a forward lens cell generally designated as 17.

The lens cell 17 comprises a lens housing which, as illustrated in FIG. 1, is defined by an externally threaded sleeve or mounting section 18 having a thread 19 cooperatively engaged with the thread 16 of sleeve 12 to effectuate adjustable mounting of the lens cell 17 relative to and axially of the sleeve 12. The lens cell 17 is characterized additionally by a radially offset annular flange 20 which is integral with the outer end portion of the sleeve or mounting section 18 and has an internal thread 21, as illustrated in FIG. 1. The lens cell 17 is a front focusing component which, in the illustrated embodiment of the invention, comprises a positive doublet of cemented together lens elements 22 and 23 and a single positive element 24 which are mounted in fixed relationship to each other.

In this latter regard, as illustrated in FIG. 1, it is seen that the sleeve section 18 generates an internal annular flange 25 which defines a shoulder 26 against which the lens element 24 is retained from axial displacement aftwardly independently of the remainder of the cell 17. Forward retention results from a spacer 27 slideably mounted within the sleeve 18 and having an annular boss 28 bearing against the lens 24 to hold the aft end portion of such lens against the shoulder 26. Moreover, the rearmost lens 23 of the positive doublet bears against the opposite end portion 29 of the spacer 27, being urged into engagement therewith by means of an externally threaded ring 30 the aft end 31 of which bears against the forward end of the lens element 22, as illustrated in FIG. 1. To adjustably secure the externally threaded ring 30 in the radially offset flange 20, said flange is provided with internal threads 32 shown to the left of FIG. 1.

The cell 17, in the embodiment illustrated, may be adjusted inwardly and outwardly on the sleeve thread 16 by means of a manually operable or engageable adjusting sleeve or cap 33 having an inwardly or centrally extending counterbored wall part 34 which defines a forward end opening 120 for the passage of light. Opening 120 is co-extensive with the light opening 35 through which light enters the forward end of cell 17. The forward end portion of the radially offset flange 20 seats in the counter sink of wall 34 with which said flange 20 is constrained for rotation by any suitable means. The cap 33 has an integral annulus 36 the interior diameter of which is slightly larger than the exterior diameter of the sleeve 12, the annulus 36 being suitably journalled on the sleeve 12 by means such as anti-friction bearings 121 mounted about sleeve 12 in any fashion suitable in the art. Thereby the cap 33 may be rotated to adjust the cell 17 inwardly and outwardly for conventional manual focusing. It is appreciated that said cell 17 may selectively set in predetermined position to the end that rotation may be in accordance with a conventional graduated scale (not shown) carried adjacent the cap 33 to designate assumed object distance. Thereby an indicator (not shown) carried by said cap 33 when rotated to a given scale position will automatically set cell 17 at an axially adjusted position for focusing on a selected object disposed at the assumed distance. To accommodate adjusting movements of the cap 33, the aft end 37 of the annulus 36 is mounted forwardly or spaced from the forward end 38 of the tubular section 11 while the inwardly extending wall part 34 of cap 33 is mounted forwardly from the forward end of the sleeve portion 15.

Figure 2:
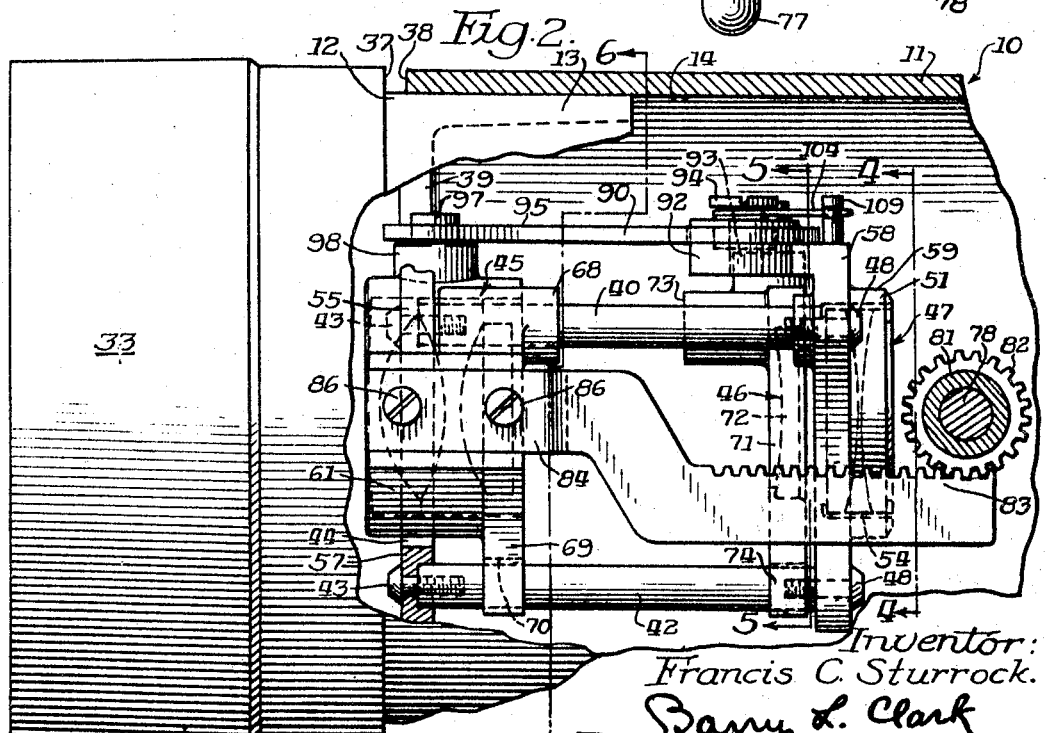
FIG. 2 is a partially sectional, partially elevational view on a composite plane normal to the plane of FIG. 1 taken along line 2—2 of FIG. 1 and looking in the direction of the arrows.

As illustrated in FIGS. 1, 2 and 3, the aft end portion 13 of sleeve 12 is separated from the forward end portion 15 thereof by means of an integral apertured annular wall or partition or radial flange 39 which extends centrally from said sleeve and defines a central or axial opening 44 into which a plurality of mounting bosses 55, 56 and 57 project as best seen in FIGS. 5 and 6. Said mounting bosses, respectively, serve as supports for a plurality of rails or rods 40, 41, and 42 which extend axially of said sleeve 12 or rearwardly from said bosses to which the forward end portion of said rods 40, 41, and 42 are secured, respectively, by means of fasteners such as screws 43, as illustrated in FIGS. 1 and 3. The spacing of the rods 40, 41, and 42 is such that they are disposed concentric with the longitudinal axis of the sleeve 12. The rails or rods 40, 41, and 42 provide mounting means for a plurality of lens cells generally designated 45, 46, and 47 in coaxial alignment with each other and with the cell 17. The lens cell 45 is a zoom or magnifying and minifying member of the construction herein illustrated. Lens cell 45 is disposed aftward of the focusing cell 17 and forward of lens cell 46. Lens cell 47 is the primary member and is fixed in position aftward of the lens cell 46.

To the end that the lens cell 47 is rigidly secured, as illustrated in FIG. 4, said lens cell 47 comprises a framework or lens holder 51 having a peripheral part 58 which extends outwardly from a central part 59 and which is fastened to the flat aft ends of the rods 40, 41, and 42 by means of suitable fasteners such as screws or the like 48, in the manner illustrated in FIGS. 2, 3, and 4. The lens holder 51 has rigidly secured therein two positive lens elements the aft of which is identified as 49 and the forward of which is identified as 50. The lens elements 49 and 50 function as a unit to focus columnate light coming from the cell 46 onto the focal or image plane (not shown). As illustrated in FIG. 3, the lens elements 49 and 50 are retained in fixed axially spaced disposition relative to one another within the framework or holder 51 by means of a spacer 52 mounted between said lens elements, the spacer 52 serving to hold the lens 49 against a retaining lip 53 generated by the holder 51, whereas the lens element 50 is urged aftward against the spacer 52 by means which include a suitable retainer 54, as illustrated in FIG. 3 and in dotted lines in FIGS. 1 and 2.

The lens cell 45, which is clearly illustrated in FIGS. 3 and 6, includes a framework or lens case 61 in which a conventional lens assembly comprising three abuting lens elements 62, 63, and 64 are retained in fixed position relative to each other. Forward retention is by engagement of the foremost lens 62 with a lip 65 which defines the forward light opening 66 to the lens cell 45. A conventional retainer member 67 holds the lens assembly of the cell 45 against the lip 65 and from aftward displacement relative to the case 61.

The cell 45, that is, the zoom member, is adjustable axially on the rods 40, 41, and 42 by means which will become next apparent. To the end that the cell 45 can be guided longitudinally or axially on the rods 40, 41, and 42, the frame or case 61 has an integral radial mounting lug or boss 68 which is clearly in evidence in FIGS. 1, 3, and 6. The boss 68 has an axially extended bore in which the rod 40 is slidably disposed. Moreover, the case 61 has another eccentrically or outwardly extending integral boss or part 69 the disposition of which is clearly evident in FIG. 2, said boss or part 69 having a recess 70, as illustrated in FIG. 6, in which the rail 42 slidably engages. By reason of the foregoing construction the zoom lens cell 45 is guidable axially of the rails 40, 41, and 42, the rails 40 and 42 guiding the movement of the said cell 45.

The lens cell 46 comprises a lens casing or frame 71, as illustrated in FIGS. 2, 3, and 5. Secured within frame 71, in a conventional fashion, is a single negative lens element 72 which serves as a compensating lens. That is to say, it is adjustable axially of the rods 40, 41, and 42, and serves as an adjusting component which insures that the rays of light from the zoom cell which have passed through the compensating lens cell 46 are collimated to the end that the prime lens will focus such rays on the focal or image plane (not shown) which in the instant embodiment of the invention is fixed in position. To the end that the cell 46 is adjustable axially of the rods 40, 41, and 42 and maintains co-axial alignment with the cells 17, 47, and 45, the frame 71 has an integral peripheral extention 74 which is recessed as at 75 to provide a track or guide in which the rod or rail 42 is slidably engaged. Moreover, frame 71 has an integral radial passaged mounting lug or boss 73 in which rod 41 is slidingly engaged. By reason of the foregoing construction, when the lens cell 46 is moved it will slide axially of the rods 40, 41, and 42, the rods 41 and 42 providing for axial guiding of said cell 46 while moving.

To move, activate or motivate, the zoom cell 45, there is provided a manually operable arm 76 which, as shown in FIG. 1, is disposed on the outside of the tubular section 11. The arm 76 has a manually engageable extention 77 by which the arm 76 is rockable about the axis defined by a pivot pin 78 on which the opposite end portion of the arm is mounted. The pivot pin 78 extends through a washer 79 which spaces the arm 76 from the tubular section 11 and through said tubular section into the interior thereof, said pivot pin being journalled in a journalling member 80 carried on the inner surface of the tubular section 11 as illustrated in FIG. 1. The hub 81 of a pinion 82 is secured on the pin 78 in any suitable manner, and as illustrated in FIGS. 1 and 2 the pinion 82 meshes with a rack bar or arm 83. The rack bar or arm is spaced slightly inwardly from the wall of tubular section 11, but has an inwardly offset forwardly projected mounting extension 84 which is seen from various aspects in each of the figures and which, as illustrated in FIG. 6, is mounted in a recess 85 formed in the lens case 61. As illustrated in FIGS. 1, 2 and 6, the mounting extension 84 is rigidly secured to the lens case 61 in axially spaced positions by means of suitable fasteners such as screws or the like 86. It is now appreciated that by reason of the foregoing construction the lens cell 45 is adjustable axially of the rods 40, 41, and 42 throughout its range of magnification by operation of pinion 82 to drive rack bar 83 either to the left or to the right with respect to FIG. 1.

To the end that the light passed by the zoom cell will be properly focused, cell 46 is synchronized and adjusted simultaneously with the zoom cell 45. The cell 46 has a focal position corresponding to each position of the cell 45. However, as the cell 45 moves through its entire range in one direction, the cell 46 is required to move back and forth as indicated by arrow 87 in FIGS. 1. That it to say the range of axial movement of the cell 45 is indicated by the arrow 88 in FIG. 1. The cell 45 is slidable within such range to the opposite limits thereof in either direction. During movement of the cell 45 in each or either direction through the entire range the cell 46 will move in two directions. While the arrow 87 is curved, it is appreciated that the movement of the cell 46 is not in a curved path but rather back and forth which is what is intended to be illustrated by the curved arrow 87.

To effectuate synchronized adjustment of the compensating cell 46, relative to the zoom cell 45, there is provided a lever in the nature of a bell-crank 89 comprised of a leg or extension defining a cam 90 and a thereto angularly disposed leg or extension 91. As illustrated in FIGS. 2, 4, and 5, the lever 89 is pivotally connected to a forwardly projected right angular extension 92 which is integral with the lens holder or framework 51 of the cell 47. The means by which the pivotal connection is effectuated is a shoulder screw 93 having a cap 94 which is spaced outwardly from the outer flat 95 of the bell-crank or lever leg 90. From the pivot screw 93 the cam 90 extends forwardly and has an elongated camming slot 96 the disposition of which is most clearly evident in FIGS. 1 and 3. A pin 97 which is threadingly mounted in a boss 98 has an outer end portion which slidably engages in the slot 96. The boss 98 is an integral outward extension of the lens case 61 of the lens cell 45, said boss 98 being aligned with the extension 92 to support the forward end portion of the arm 90 substantially parallel to rail or rod 40, as clearly illustrated in FIGS. 2 and 6.

The leg 91 of the lever 89 has an outer end recess or pocket 99 which is most clearly seen in FIG. 1. A pin 100 seats or engages in said recess projecting thereinto from its securance to a boss 101 which is integral with lens frame 71 of the cell 46, as clearly illustrated in FIG. 5. To the end that the synchronized operation of the cells 45 and 46 is well managed and smoothly controlled, a torsion spring 102 is employed, as illustrated in FIGS. 1, 2, 4 and 5. The torsion spring has a pair of legs 103 and 104, and a medial portion 105 which is bent about the front face of the screw 93, the medial portion 105 of said spring being retained between the cap 94 of said screw 93 and the washer 106 mounted about screw 93 and disposed against the outer flat 95 of the leg 90. The outer end portion of the leg 103 is bent aftwardly from the medial portion 105 and engages in a recess 107 formed in the pin 100, in which recess said leg 103 is held under tension in a manner which is evident having reference to FIG. 1 and as further illustrated in FIGS. 2, 4 and 5. The outer end portion of the other leg 104 of said spring is bent aftwardly from the medial portion 105 and engaged under tension in the recess 108 of a pin 109, the pin 109 being rigidly secured to the lens holder or framework 51 of the cell 47 as illustrated in FIGS. 1, 2 and 4. By reason of the torsion spring 102, the cell 46 is under continuous forward bias tending to rotate cam 90 counterclockwise when considered from FIG. 1 and ensure cam and follower engagement. In this manner, play between the coupling parts and coupled lens cells 45 and 46 is prevented.

Having thus described the details of construction of the embodiment of the invention herein illustrated, a brief description of the manner in which the illustrated device operates and next ensuing is provided to facilitate understanding. When the camera is employed, the cap 33 is adjusted by rotation to set the position of the cell 17 to correspond with the approximate distance therefrom to an object (not shown) to be photographed. Thereafter, by appropriate manipulation of the arm 76, the lens cell 45 will be driven by the co-action of the pinion 82 and gear 83 axially of the rods 40, 41, and 42 to a station selected for the magnification desired within the range available. It is appreciated that any station axially of the range over which the cell 45 is adjustable may be employed to give a desired magnification. In accordance with conventional arrangements, magnification occurs in one direction of movement of the cell 45 while minification occurs in the other direction of movement.

For each position capable of being assumed by the cell 45 within its range of adjustment there is a corresponding position at which the cell 46 requires to be positioned in order to pass light in a manner such that the prime cell 47 will focus upon a focal or image plane (not shown). However, the operable relationship between the cells 45 and 46 is not such that for synchronization said cells 45 and 46 require constant, equal spacing from each other. On the contrary, while the cell 45 is adjusted from one end of its range to the other, in a given direction, the cell 46 is required to move backwardly and forwardly axially of the rails or rods 40, 41, and 42 to the end that proper focusing will result.

The latter result is effectuated by means of a driving force for the cell 46 brought to bear thereon through the bell-crank 89 which is rocked by the pin 97 as the cell 45 is adjusted. By reason of the engagement of the pin 97 in the slot 96 the bell-crank 89 will assume an attitude or aspect for each position of the cell 45 by adjustment about the pivot provided by the screw 93. Accordingly, the leg 91 of the bell-crank 89 as well as the cell 46 controlled by such leg will be caused to assume a position or attitude corresponding to that of the cell 45.

The slot 96 is curved on a predetermined radius or in a manner such that the disposition of the cell 45 at each increment within its range of movement will cause the cell 46 to be disposed in a synchronous or focusing position relative to said cell 45.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. A control mechanism for an optical system having a fixed part and a pair of optical components displaceable relative to the fixed part and to each other along the optical axis of the system and comprising:
   operable means for displacing a first of said optical components along the optical axis of the system;
   a crank-like member pivotally secured to said fixed part and having a single arcuate cam slot defining the range of movement of the first optical component and extending generally longitudinally of the optical axis of the system in a flat plane and a part extending at an angle from said cam slot and coupled to the second of said optical components, and a cam follower secured to the first of said optical components and slidably engaging said cam slot to rock said crank-like member responsively to the conditioning of the first of said optical components as it moves through its range in one direction thereby to move the second of said optical components in opposite direction.

2. The control mechanism defined in claim 1, and further including a pin secured to the second of said optical components and engaged in said cam slot for moving the second optical component, and a biasing spring bent about the pivot for said crank-like member and having opposite ends bearing against said pin and said fixed part for urging said crank-like member into follower engagement.

3. In a lens system, a supporting frame comprising:
a plurality of parallel rails extending longitudinally of the optical axis of said system in fore to aft disposition;
a pair of adjustable lens carrying casings mounted in spaced apart relationship for sliding movement relative to each other on said rails along the optical axis of said system;
a fixed lens carrying frame for an objective spaced from said adjustable lens carrying casings and disposed along the optical axis of said system;
a bell-crank member disposed wholly in a plane for coupling said casings and having
a pair of angularly disposed parts and
a medial part pivotally connected to said frame, one of said angularly disposed parts defining an elongated arcuate camming slot extending in a flat plane generally longitudinally of the optical axis of said system;
a cam follower secured to a first of said adjustable lens carrying casings and slidably engaged in said camming slot,
the other of said angularly disposed arms having an end opening;
a pivot pin secured to the second of said adjustable lens carrying casings and pivotally engaged in said end opening;
manually operable means to slide one of said adjustable lens carrying casings longitudinally of said rails in one direction to rock said bell-crank member and cause the other of said adjustable lens carrying members to slide in opposite directions longitudinally of said rails;
a boss secured to said frame;
a pivot member secured to said frame and providing the pivotal connection for said medial part, and
a spring bent about and engaging said pivot member and having opposite end portions bearing against said boss and said pivot pin
to bias the second of said casings forwardly and said bell-crank member into follower engagement.

4. A control mechanism according to claim 1 further characterized by a pair of parallel rails arranged for slidingly supporting said optical components for axial displacement, the plane of said crank-like member being parallel to a plane defined by said parallel rails.

5. A control mechanism according to claim 4 and having a third rail disposed parallel to said pair of rails, and further characterized in that each of said optical components is slidingly supported by a respective of said pair of rails and said third rail.

References Cited

UNITED STATES PATENTS

| | | | |
|---|---|---|---|
| 1,167,164 | 1/1916 | Grebe | 350—255 |
| 2,547,187 | 4/1951 | Walker | 350—187 |
| 2,945,415 | 7/1960 | Bechtold et al. | 350—187 |

DAVID SCHONBERG, *Primary Examiner.*

MICHAEL J. TOKAR, *Assistant Examiner.*

U.S. Cl. X.R.

350—187

Dedication 3,445,155.—*Francis C. Sturrock*, Skokie, Ill. MECHANISM FOR RELATIVE ADJUSTMENT OF AXIALLY SPACED LENS ELEMENT. Patent dated May 20, 1969. Dedication filed Apr. 14, 1972, by the assignee, *Bell & Howell Company*.

Hereby dedicates to the Public the remainder of the term of said patent.

[*Official Gazette July 25, 1972.*]